United States Patent [19]

Kishi et al.

[11] Patent Number: 5,378,416
[45] Date of Patent: Jan. 3, 1995

[54] METHOD OF AND SYSTEM FOR MANUFACTURING POWDER MOLDINGS

[75] Inventors: Yuji Kishi, Kanagawa; Takeshi Katagiri, Machida, both of Japan

[73] Assignees: Nissan Motor Co., Ltd., Yokohama; Yoshizuka Seiki Co., Ltd., Kawasaki, both of Japan

[21] Appl. No.: 97,005

[22] Filed: Jul. 27, 1993

[30] Foreign Application Priority Data

Jul. 28, 1992 [JP] Japan .................................. 4-219550
Dec. 28, 1992 [JP] Japan .................................. 4-358509
May 28, 1993 [JP] Japan .................................. 5-148342

[51] Int. Cl.⁶ .............................................. B29C 43/02
[52] U.S. Cl. .................................. 264/40.5; 264/109; 264/123; 425/344; 425/352

[58] Field of Search ...................... 264/40.5, 109, 123; 425/344, 352

[56] References Cited

FOREIGN PATENT DOCUMENTS 54-41749 12/1979 Japan .
02-16879 5/1990 Japan .

*Primary Examiner*—Mary Lynn Theisen
*Attorney, Agent, or Firm*—Foley & Lardner

[57] ABSTRACT

A method of manufacturing a powder molding having a undercut portion, etc. comprises filling a space of a die with a powder, pressing the powder in the space of the die by punches inserted therein through an opening of the die, and withdrawing a undercut portion shaping means from the space of the die for extracting the powder molding.

14 Claims, 15 Drawing Sheets

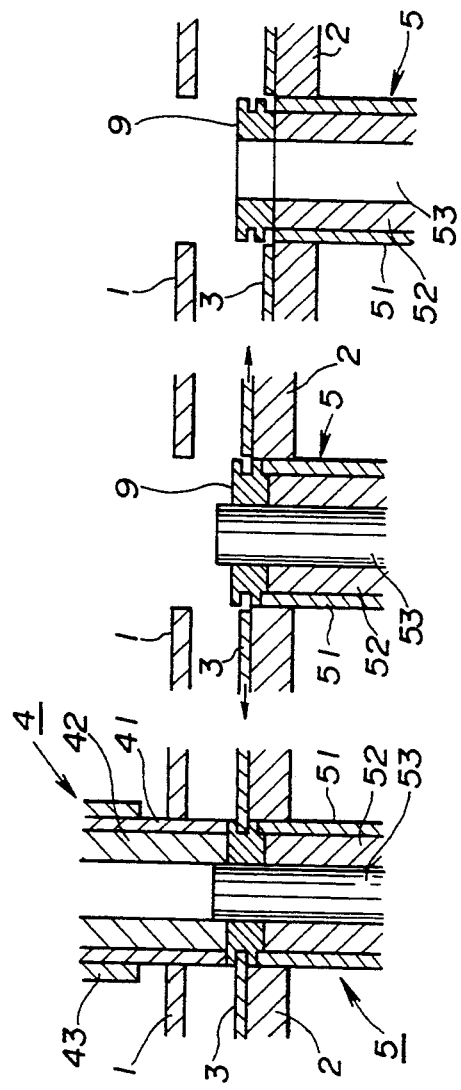
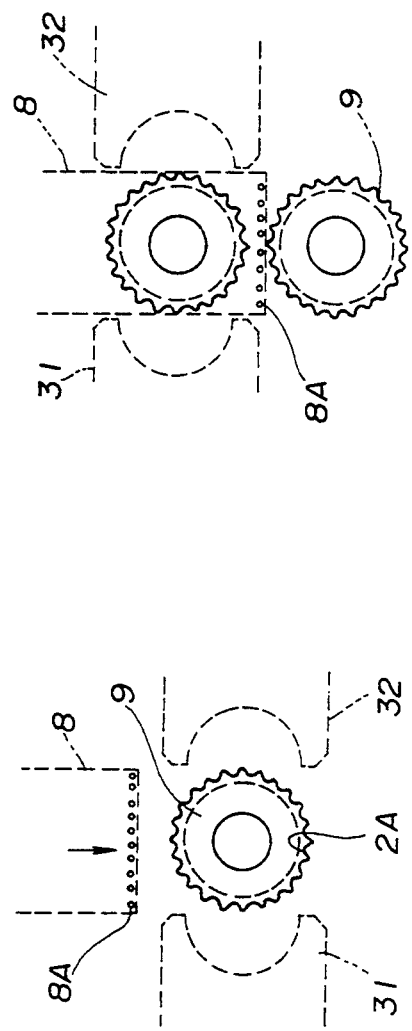

FIG.4
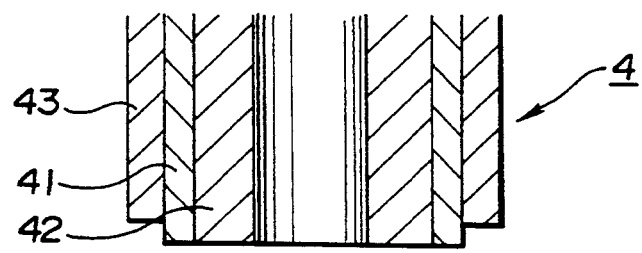
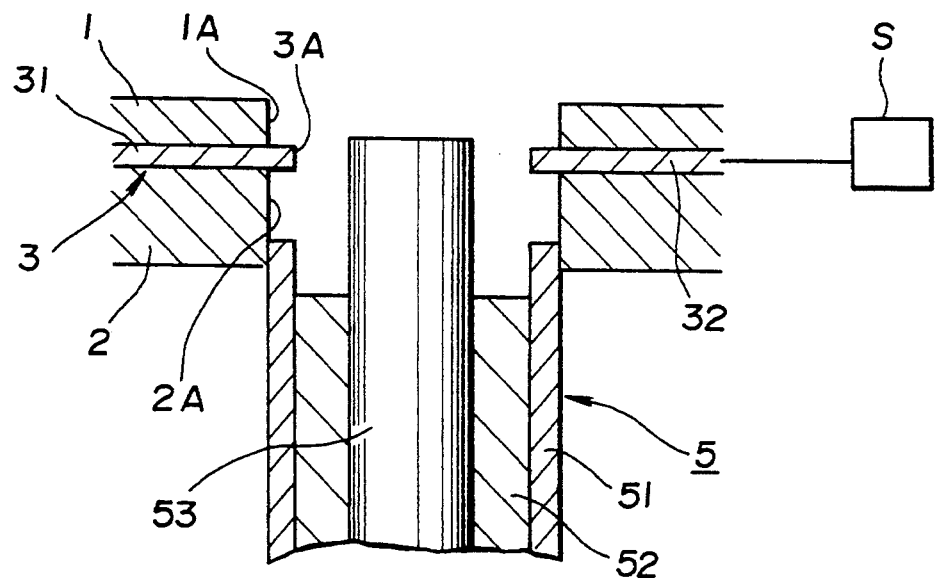

FIG.5
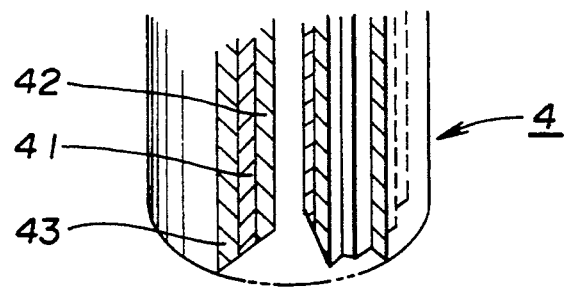
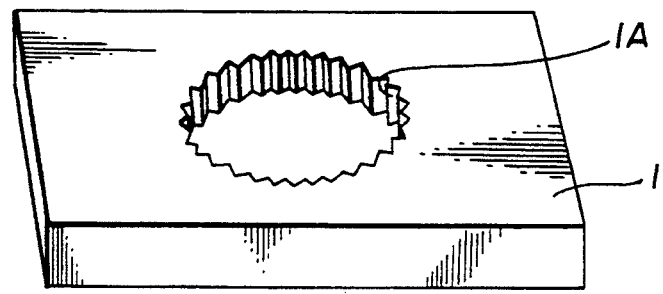
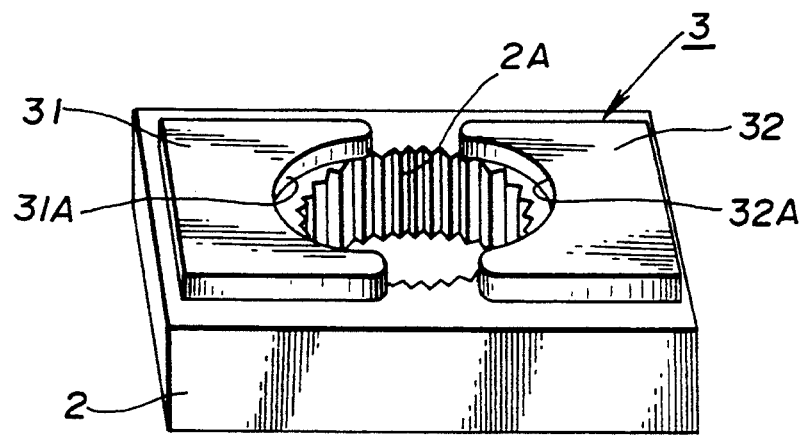
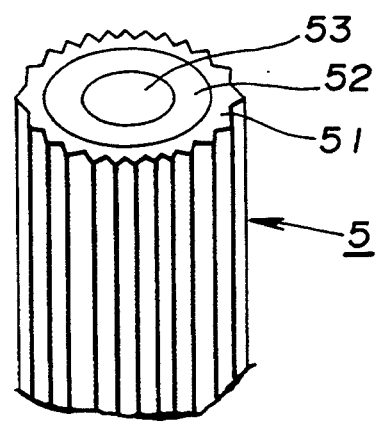

FIG.8a(PRIOR ART)  FIG.8b(PRIOR ART)
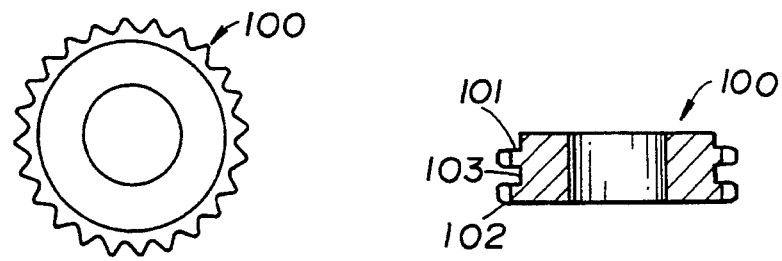
FIG.8c(PRIOR ART)
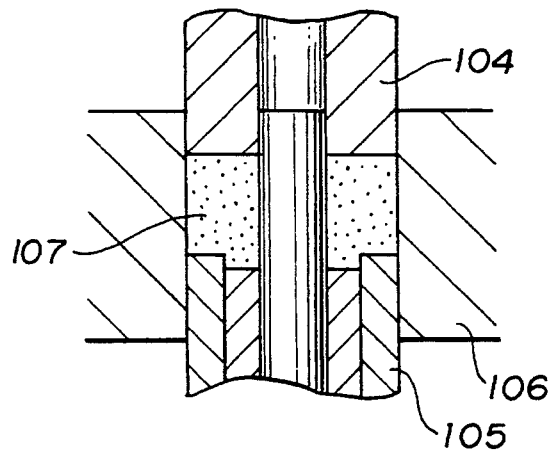
FIG.8d(PRIOR ART)  FIG.8e(PRIOR ART)
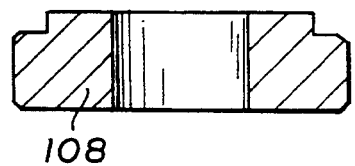 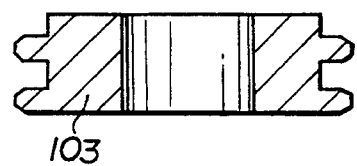
FIG.8f(PRIOR ART)
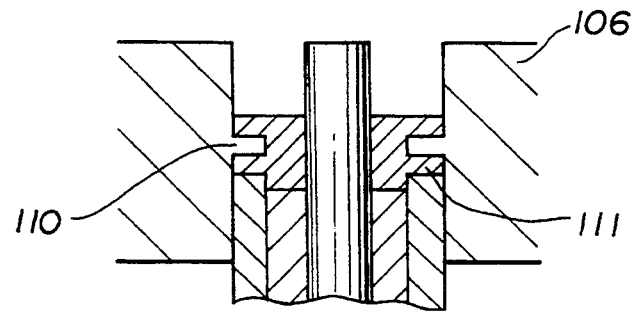

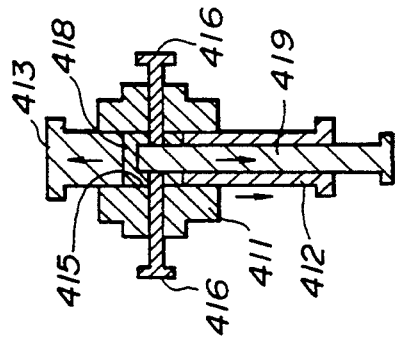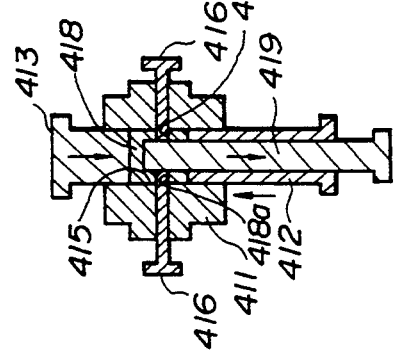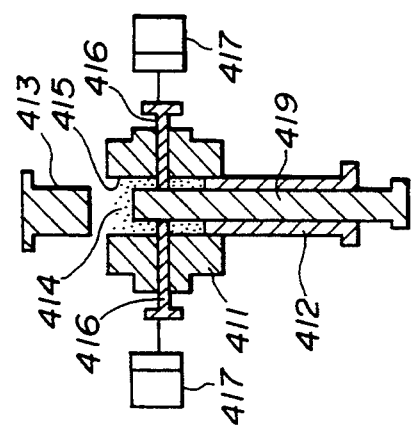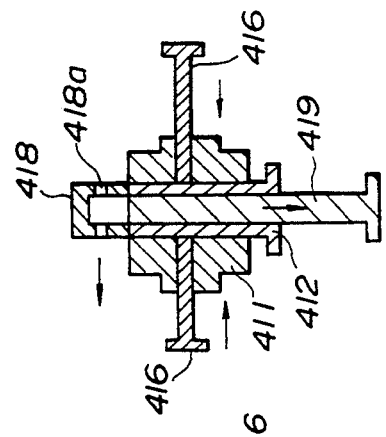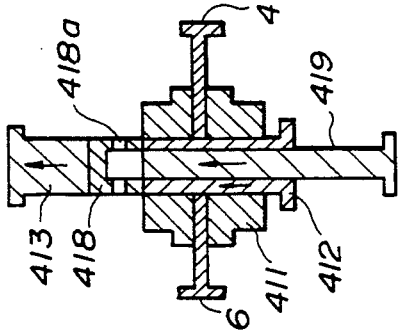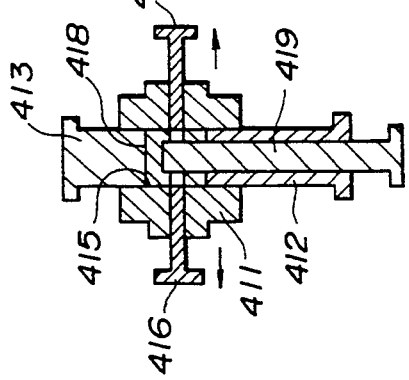

METHOD OF AND SYSTEM FOR MANUFACTURING POWDER MOLDINGS

BACKGROUND OF THE INVENTION

The present invention relates to a method of and system for manufacturing powder moldings having a undercut portion, etc.

Conventionally, powder moldings having, for example, a undercut portion, are manufactured as follows: By way of example, a cam sprocket 100, as one of such powder moldings, having a undercut portion 103 between teeth trains 101, 102 as shown in FIGS. 8a and 8b is formed in accordance with a process as shown in FIGS. 8c to 8e.

Specifically, a powder 107 within a die 106 is pressed by upper and lower punches 104, 105 to form a wide sprocket molding 108, which is sintered then machined to cut the undercut portion 103.

However, with such conventional manufacturing method, a machining process of cutting the undercut portion 103 is increased, resulting in a cost up. Therefore, a direct formation of the undercut portion 103 in a powder molding process is requested.

However, if the undercut portion 103 is tried form according to the conventional manufacturing method, a part 110 of the die 106 enters the undercut portion 103 as shown in FIG. 8f, resulting in impossible removal of a finished product 111.

On the other hand, referring to FIGS. 9a and 9b, JP 54-41749 discloses a system having dies 106A, 106B which divide in the transverse direction. However, with this system, teeth 101, 102 of a cam sprocket 100 are caught on the dies 106A, 106B, resulting in impossible removal of the cam sprocket 100.

It is, therefore, an object of the present invention to provide a method of and a system of manufacturing powder moldings having a undercut portion, etc. which enables direct formation of the undercut portion, etc. by powder molding.

SUMMARY OF THE INVENTION

According to one aspect of the present invention. there is provided a method of manufacturing a powder molding having a predetermined portion, the method relying upon at least one die formed with a space having an opening on both ends thereof, first and second punches and a means for shaping The predetermined portion of the powder molding, the method comprising the steps of:

filling the space of the at least one die with a powder;

pressing said powder in the space of the at least one die by the first and second punches inserted therein through the opening of the at least one die; and withdrawing the shaping means from the space of at least one die for extracting the powder molding.

According to another aspect of the present invention, there is provided an apparatus for manufacturing a powder molding having a predetermined portion, comprising:

at least one die formed with a space to be filled with a powder, said space having an opening on both ends thereof;

first and second punches arranged to be inserted into said space of said at least one die through said opening, said first and second punches pressing said powder in said space of said at lease one die; and a means, movably arranged relative to said space of said at lease one die, for shaping the predetermined portion of the powder molding, said shaping means having a shape corresponding to a shape of the predetermined portion of the powder molding.

BRIEF DESCRIPTION OF THE DRAWINGS

FIGS. 3a to 3c are views similar to FIG. 2 showing processes of extracting a product powder molding;

FIGS. 3d and 3e are views similar to FIG. 1e. showing operation of an ejector bar for discharging a product powder molding;

FIG. 4 is a view similar to FIGS. 3a to 3c, showing an apparatus for manufacturing the powder molding having a undercut portion;

FIG. 5 is an exploded perspective view showing the apparatus of FIG. 4;

FIGS. 8a to 8f are diagrammatic drawings for explaining a conventional method of manufacturing a powder molding having a undercut portion;

FIG. 9b is a view similar to FIG. 4, showing the conventional apparatus of FIG. 9a;

FIGS. 11a to 11f are views similar to FIGS. 10a to 10f, showing processes of forming a side hole in the powder molding according to a third preferred embodiment of the present invention;

DETAILED DESCRIPTION OF THE INVENTION

Figure 1D:
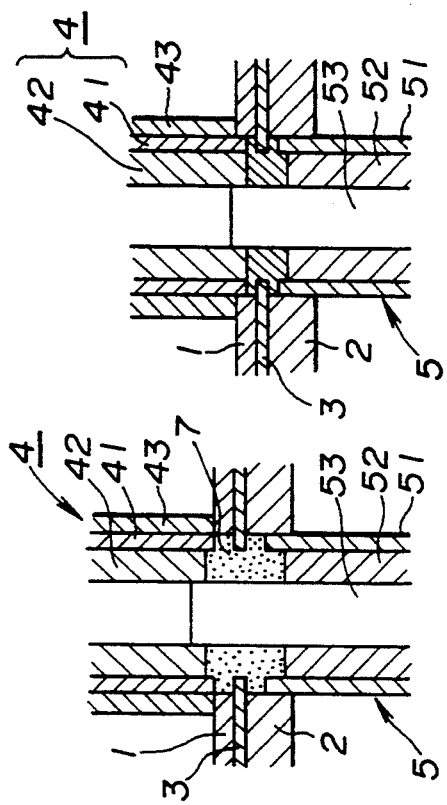
FIGS. 1a to 1d are sectional views showing processes of pressing a powder molding having a undercut portion according to a first preferred embodiment of the present invention.

Referring to FIGS. 1a to 7c, there is shown a first preferred embodiment of the present invention. In this embodiment, a powder molding having a undercut portion is in the form of a cam sprocket having teeth trains as described in connection with FIGS. 8a and 8b.

Referring first to FIGS. 4 and 5, a manufacturing system of a cam sprocket 100 comprises upper and lower dies 1, 2 dividing into upper and lower portions and having die holes 1A and 2A to be filled with a powder, a cam die 3 arranged between divided faces of upper and lower dies 1, 2, and upper and lower punches 4, 5 to be inserted into the upper and lower die holes 1A and 2A.

The upper punch 4 comprises a cylindrical upper first punch 41 located at the outermost periphery, and a cylindrical upper second punch 42 concentrically mounted to the upper first punch 41 on the inside thereof. Arranged on the outside of the upper first punch 41 is a cylindrical die presser punch 43 having a lower end which comes in contact with an upper side of the upper die 1. These die presser punch 48 and upper first and second punches 41, 42 are concentrically slidably mounted to each other.

The lower punch 5 comprises a lower first punch 51 arranged at the outermost periphery, a lower second punch 52 arranged on the inside of the lower first punch 51, and a core 53 located at The center. These lower first and second punches 51, 52 and core 53 are concentrically slidably mounted to each other.

The upper and lower die holes 1A, 2A of the upper and lower dies 1, 2 have the same diameter and are disposed coaxially. The upper and lower dies 1, 2 are moved independently in the direction of a center axis of the upper and lower die holes 1A, 2A.

On the other hand, the cam die 3 is divided into left and right cam die plates 31, 32. The cam die plates 31, 32 have divided faces located on a plane including the center axis of the upper and lower die holes 1A, 2A, and having semicircular recesses 31A, 32A formed to be opposite to each other. A circular undercut corresponding die hole 3A is defined by joining these divided faces to each other. The undercut corresponding die hole 3A has a smaller diameter than the upper and lower die holes 1A, 2A of the upper and lower dies 1, 2, and serves to form a circular undercut portion 103 of the cam sprocket 100.

In this embodiment, the cam die plates 31, 32 are arranged left and right movably on an upper side of the lower die 2, and vertically moved together with the lower die 2. Edges of the recesses 31A, 32A of the left and right cam die plates 31, 32 are moved to go in and out an imaginary cylinder face which interconnects inner peripheral faces of the upper and lower die holes 1A, 2A of the upper and lower dies 1, 2.

Additionally, arranged to the cam die plates 31 32 is a sensor S for detecting a difference between applied forces which act on the upper and lower sides of the cam die plates 31, 32. By way of example, the sensor S may be a strain gauge which detects force out of a strain amount in response to applied force. Of course, various force sensors are usable in addition to the strain gauge.

Figure 1C:
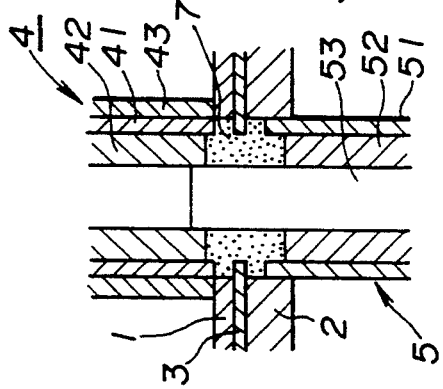
Figure 1B:
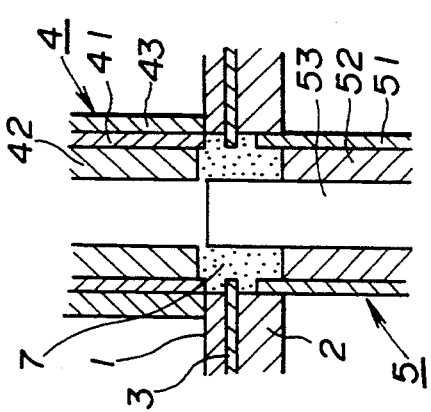
Figure 1A:
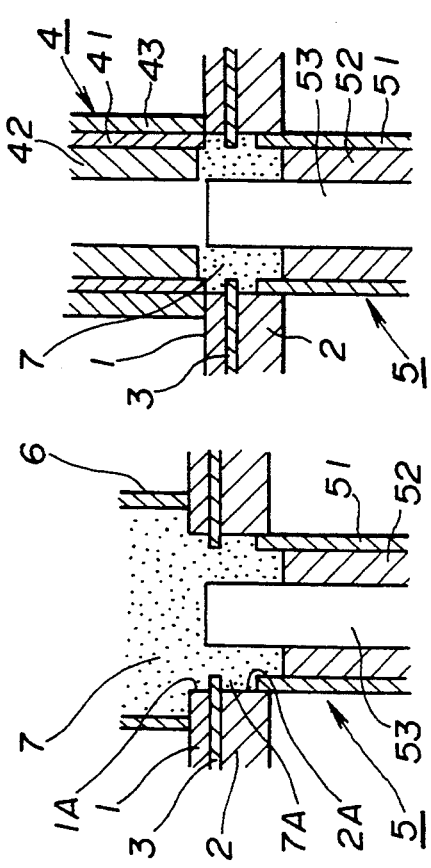
Figure 1E:
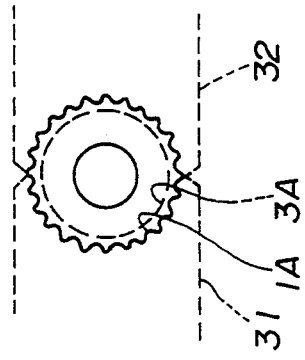
FIG. 1e is a plan view showing cam die plates with a recess.
Figure 2:
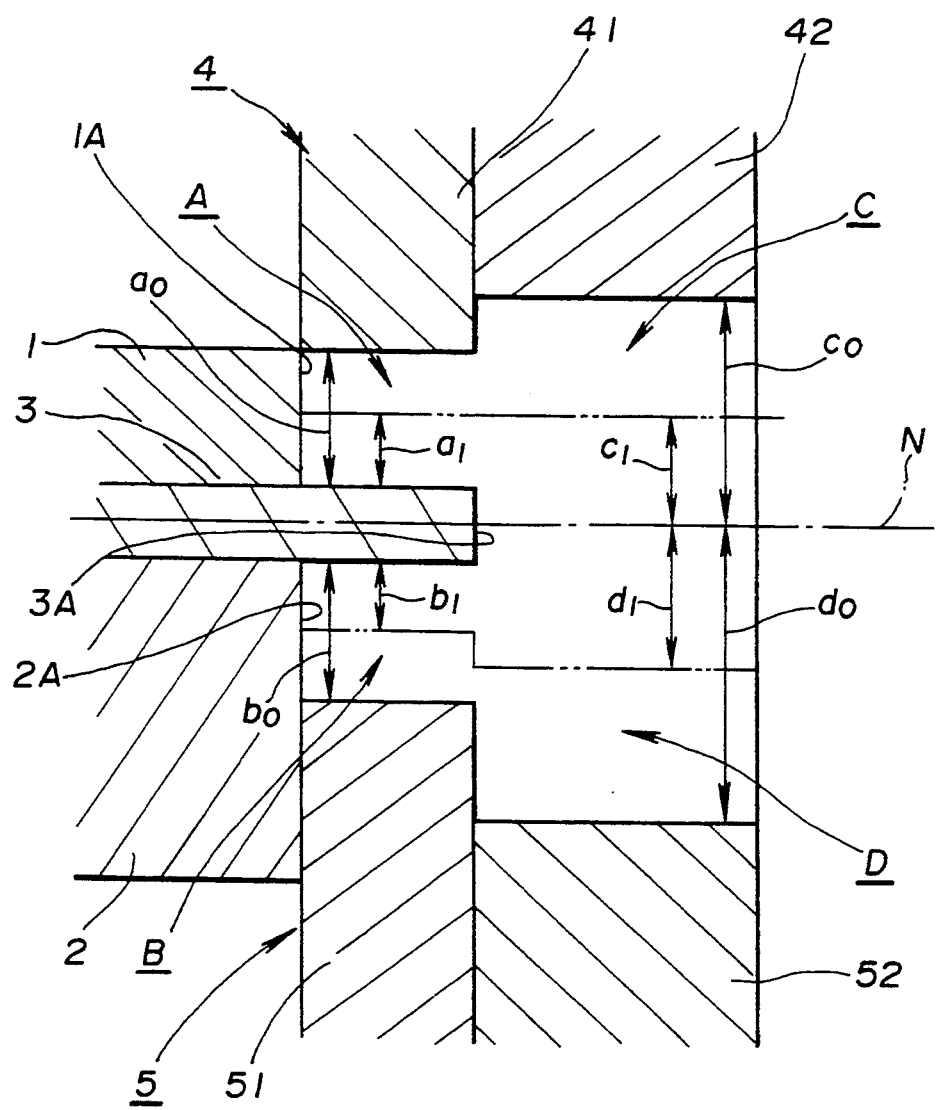
FIG. 2 is a view similar to FIGS. 1a to 1d. showing dies for explaining a proportional pressing process.

Referring next to FIGS. 1a to 2, a molding process of the cam sprocket 100 will be described.

Operation is based on a withdrawal method that the lower second punch 52 is stationary. However, a double press method may be adopted that the lower die 2 is stationary and the upper and lower punches 4, 5 provide pressure from the upper and lower directions. Moreover, the other die or one of the punches may be stationary.

FIG. 1a shows a state that a powder 7 is put in the upper and lower dies 1, 2 and the die holes 1A, 2A, 3A of the cam die 3 from a feeder 6. Since simple filling operation of the powder 7 can make a powder lacking portion 7A in a hole rim lower portion of the undercut corresponding die hole 3A of the cam die 3, the upper die 1, cam die 3, and lower die 2 are raised higher than a predetermined position in accordance with the power lacking portion 7A so as to obtain a greater filling depth, and a filling amount of the powder 7 is increased in accordance with the powder lacking portion 7A to produce an overfilling state. Vibrating the lower first punch 51 is also effective.

The feeder 6, upper die 1, cam die 3, and lower die 2 are moved downward at the same time to produce an uniform filling state of the powder 7, which is not shown, however.

Thereafter, the feeder 6 is withdrawn, and the upper first and second punches 41, 42 and the die presser punch 43 are moved downward, producing a filling state as shown in FIG. 1b.

Referring to FIG. 1c, transfer of the filling powder 7 is carried out for obtain a filling depth proportional to a height of a product cam sprocket. Specifically, in a state that the lower first punch 51 is stationary, the upper first and second punches 41, 42, die presser punch 43, upper die 1, cam die lower die 2, and lower first punch 51 are moved downward by a predetermined amount to obtain a filling amount proportional to a height of the product cam sprocket as shown in FIG. 1c.

Referring to FIG. 2, with the cam sprocket in this embodiment, the following pressed portions are distinguished: a first pressed portion A between an upper side of the cam die 3 and the upper first punch 41, a second pressed portion B between a lower side of the cam die 3 and the lower first punch 51, a third pressed portion C between the upper second punch 42 and an imaginary neutral plane N of the cam die 3, and a fourth pressed portion D between the lower second punch 52 and the imaginary neutral plane N of the cam die 3. If heights of the pressed portions A to D of the product cam sprocket after pressing operation are a1, b1, c1, and d1, and filling depths of the pressed portions A to D are a0, b0, c0, and d0, a rate of the filling depths is the same as that one of the heights. Ordinarily, each filling depth is set to be about twice as many as each height.

Referring to FIG. 1d, pressing operation is carried out in proportional molding. In that case, for preventing the cam die 3 from suffering a difference between applied forces from the upper and lower directions, it is necessary to mold the cam sprocket so as to form a neutral zone about the cam die 3 as a center. That is, control is carried out so that a rate of dimensions of the first, second, third, and fourth pressed portions A, B, C, D is the same as that one of the product cam sprocket at any point during pressing operation. Specifically, the punches and dies are relatively moved to the cam die 3 as a center from the upper and lower direction by an amount proportional to a height of the product cam sprocket. and relative movement speeds between the upper and lower dies 1, 2 and the cam die 3, and between the upper first and second punches 41, 42 and the lower first punch 51 are controlled so that a rate of pressing speeds when compressing the pressed portions is substantially the same as that one of the dimensions a0, b0, c0, d0 of the pressed portions of the finished molding throughout all pressing process from start of pressing operation to completion thereof.

During pressing operation, the sensor S detects a difference between forces which act on the upper and lower sides of the cam die plates 31, 32. If this difference becomes excessive, the sensor S generates an error signal to interrupt pressing operation, thus preventing breakage of the cam die 3.

Since the upper die 1 is thin due to a height thereof determined by the thickness a0 of the product cam sprocket, and thus does not provide great force when closely contacting the cam die 3 from both sides thereof by hydraulic pressure, it is better to press the upper die 1 by the die presser punch 43 from the upper direction.

Pressing operation is finished as shown in FIG. 1d. Referring to FIG. 3a, after pressing operation, the upper and lower punches 4, 5 are withdrawn or relatively withdrawn (When the lower second punch 52 is stationary, the same operation is obtained by determining upward movement amounts of the punches and dies), and the die presser punch 43 and the upper die 1 are moved upward with a certain residual pressure held so as to produce a state as shown in FIG. 3b for preventing crack.

Referring to FIG. 3c, the lower die 2, lower first punch 51, and core 53 are moved downward to fichish extraction of the product cam sprocket 9. Immediately after this, a product cam sprocket ejector bar 8 is moved forward as shown in FIGS. 3d and 3e to press the product cam sprocket 9 forward and jet air out of holes 8A arranged at an end thereof for blowing away powder placed on the cam die 3, lower die 2, and lower first and second punches 51, 52. As the case may be, the product cam sprocket ejector bar 8 may have a vacuum function for inhalation of powder.

The product cam sprocket ejector bar 8 is returned, and the cam die 3 is moved forward whereas the upper die 1 is moved downward to closely contact the cam die 3, then the upper die 1, cam die 3, lower die 2, lower first punch 51, and core 53 are moved upward up to a predetermined position, and the feeder 6 is moved forward again, thus returning a filling process as shown in FIG. 1a.

Figure 6:
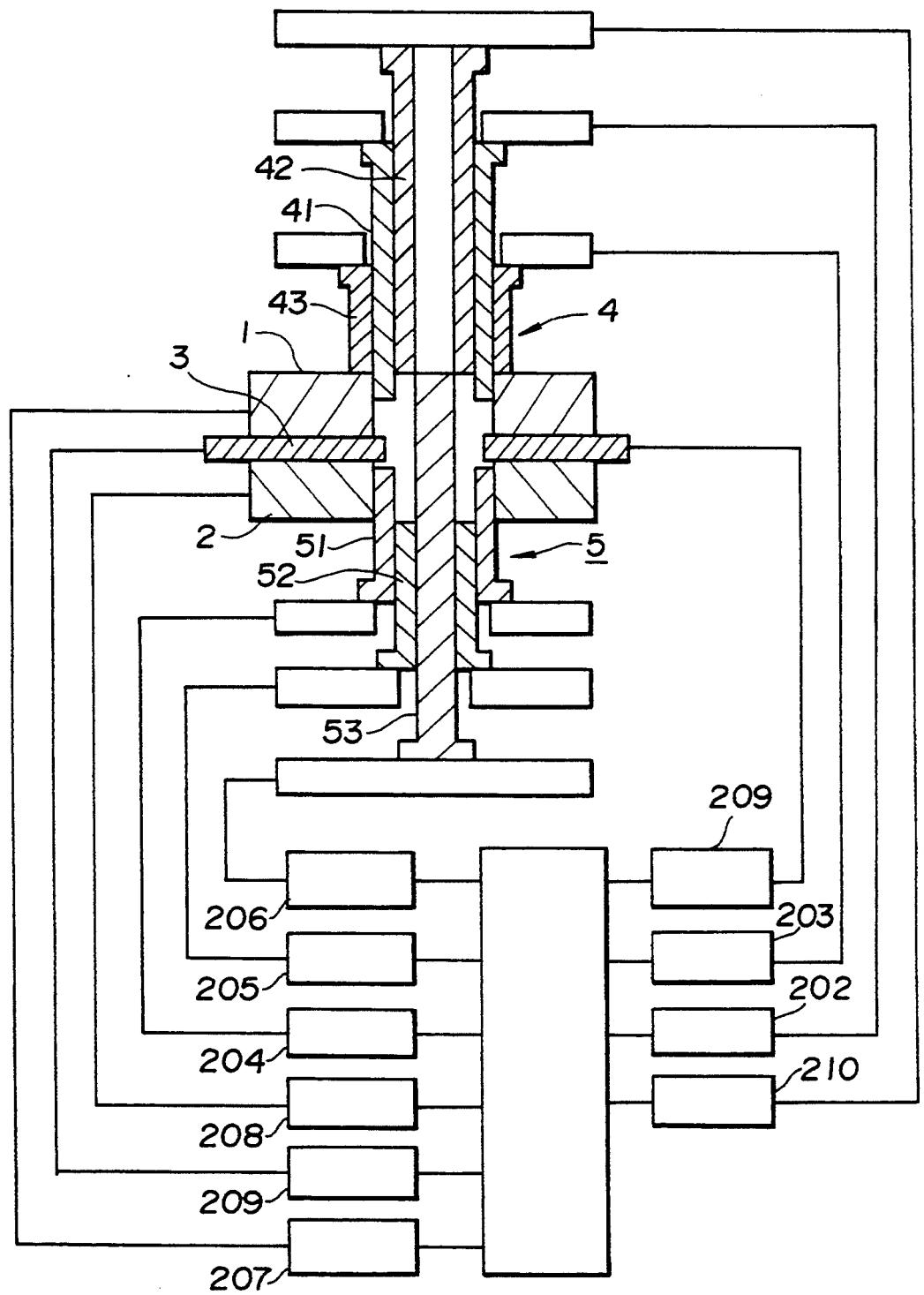
FIG. 6 is a block diagram showing a general constitution of the apparatus of FIG. 4.

Referring to FIG. 6, a general structure of the manufacturing system will be described. The die presser punch 43 and the upper first and second punches 41, 42 are vertically driven by die presser punch drive mechanism 202 and upper first and second punches drive mechanisms 201, 202, respectively, whereas the lower first and second punches 51, 52 and the core 53 are vertically driven by lower first and second punches drive mechanisms 204, 205 and a core drive mechanism 206, respectively.

Additionally, the upper and lower dies 1, 2 are vertically driven by upper and lower dies drive mechanisms 207, 208, whereas the cam die 3 is driven rightward and leftward by a cam die drive mechanism 209.

The die presser drive mechanism 203, upper first and second punches drive mechanisms 201, 202, lower first and second punches drive mechanisms 204, 205, core drive mechanism 206, upper and lower dies drive mechanisms 207, 208, and cam die drive mechanism 209 are connected to a drive control means 210 so as to control a drive procedure of each pressed portion.

The drive mechanisms may be a fluid or oil pressure cylinder, a screw drive mechanism using, for example, a ball screw, a crank mechanism, etc.

Figure 7A:
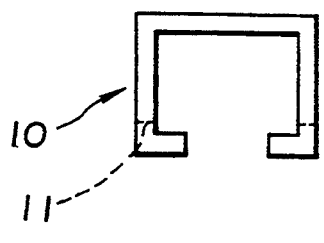
FIGS. 7a to 7c are schematic views showing examples of the powder molding having a undercut portion.
Figure 7C:
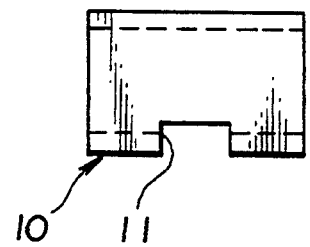
Figure 7B:
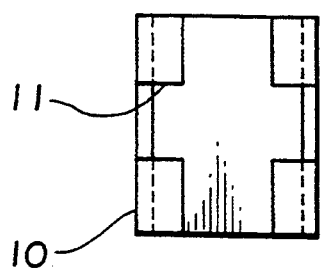
Figure 9A:
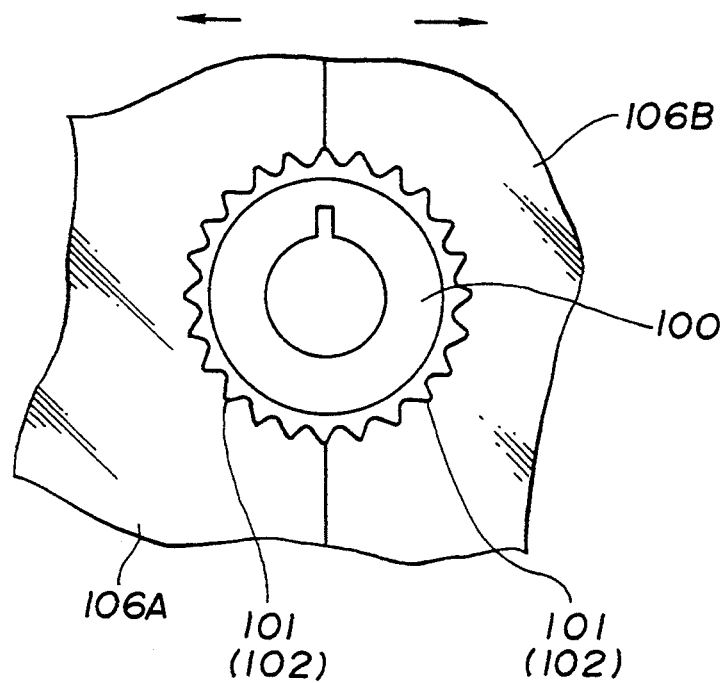
FIG. 9a is a view similar to FIGS. 3d and 3e, showing a conventional apparatus for manufacturing the powder molding having a undercut portion.
Figure 9B:
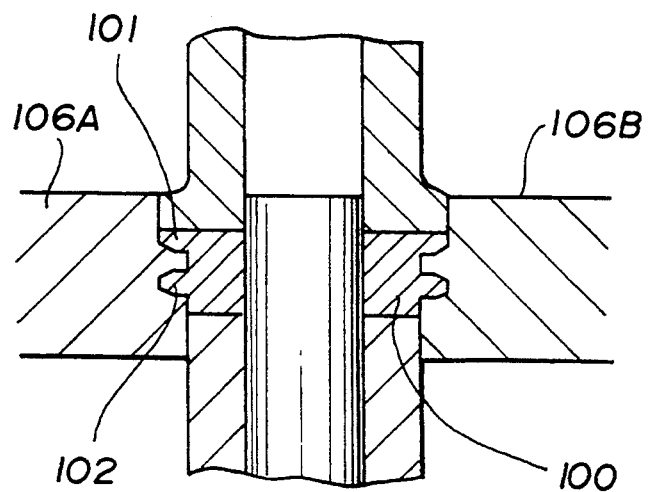

In this embodiment, the powder molding having a undercut portion is in the form of a cam sprocket having teeth trains, but it is not limited thereto. and may be a molding 10 having a undercut portion 11 as shown in FIGS. 7a to 7c, etc.

Referring next to FIGS. 10a to 10f, there is shown a second preferred embodiment of the present invention. This embodiment shows a method of forming a cylindrical powder molding having a side hole.

A press mold for use in this method comprises a cylindrical die 301 fixed to a die plate (not shown), a cylindrical lower punch 302 moved upward and downward by a pressure drive apparatus (not shown) such as a hydraulic cylinder and inserted into an axial hole of the die 301 from the lower direction, and a cylindrical upper punch 308 moved upward and downward by another pressure drive apparatus (not shown) such as a crank mechanism and inserted into the axial hole of the die 301 from the upper direction. The press mold has a mold space 305 to be filled with a powder 304 which is defined by the axial hole of the die 301 and an upper end face of the lower punch 302.

A side hole forming apparatus comprises a side hole shaping horizontal rod 306 movably arranged in such a manner as to pierce through one of right and left portions of the die 301 and traverse horizontally in a vertically viewed center portion of the mold space 305, and a horizontal drive apparatus 307 for horizontally driving the horizontal rod 306 such as a hydraulic or pneumatic cylinder, the horizontal rod 306 having an outer diameter equal to an inner diameter of the side hole to be formed.

In this embodiment, the horizontal rod 306 has a pointed end buried in another of right and left portions of the die 301. Preferably, the pressure drive apparatus and the horizontal drive apparatus 307 are controlled by, for example, a hydraulic servo circuit.

Manufacture of the powder molding having a side hole by such apparatus is carried out in accordance with processes as shown in FIGS. 10a to 10f.

Figure 10A:
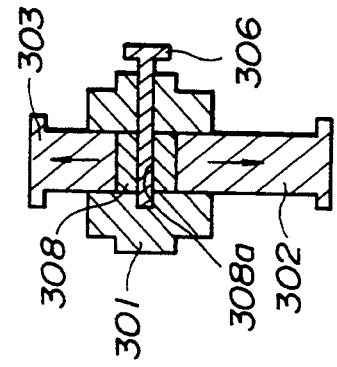
FIGS. 10a to 10f are views similar to FIG. 9b, showing processes of forming a side hole in the powder molding according to a second preferred embodiment of the present invention.

Referring to FIG. 10a, the lower punch 302 is inserted into the axial hole of the die 301 at a predetermined position thereof so as to define the mold space 305, and the horizontal rod 306 is pierced through the mold space 305 whereas the upper punch 308 is located in an upper position apart from the mold space 305. In this state, a feeder (not shown) provides the powder 304 to the mold space 305.

Figure 10B:
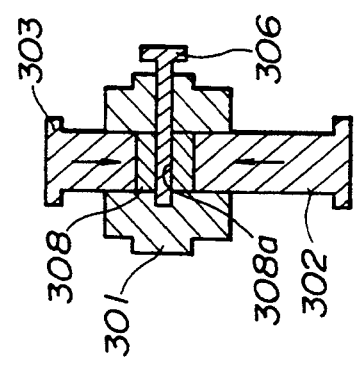

Next, referring to FIG. 10b, the upper punch 303 is moved downward and inserted into the mold space 305, while the lower punch 302 is move upward and inserted deeper into the mold space 305. The powder 304 is pressed by the upper punch 303 and the lower punch 302 from both upper and lower directions, and compressed to arrive at a predetermined density, thus obtaining a compressed molding 308 having a cavity corresponding to a side hole 308a by the horizontal rod 306.

Upon this pressing operation, for avoiding the horizontal rod 306 being deformed by a unbalance load. it is necessary to press the horizontal rod 306 at arm equal compression rate from both upper and lower directions. For this purpose, a rate of an upward movement speed of the lower punch 302 to a downward movement speed of the upper punch 303 is determined to be proportional to a rate of a travel distance of the upper punch 303 up to completion of pressing on an upper side of the powder 304 to that one of the lower punch 303 up to completion of pressing on a lower side of the powder 304. By way of example, if the travel distance of the upper punch 308 is equal to that one of the lower punch 302, the downward movement speed of the upper punch 303 is determined to be equal to the upward movement speed of the lower punch 302, and if the travel distance of the upper punch 308 is twice as long as that one of the lower punch 302, the downward movement speed of the upper punch 303 is determined to be twice as large as to the upward movement speed of the lower punch 302.

Figure 10C:
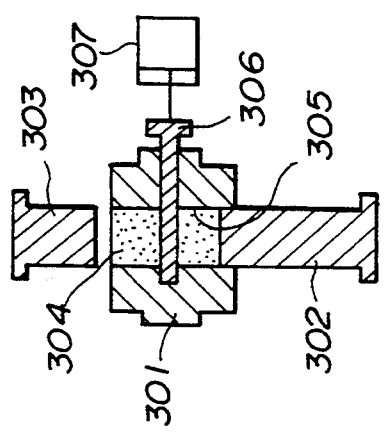
Figure 10D:
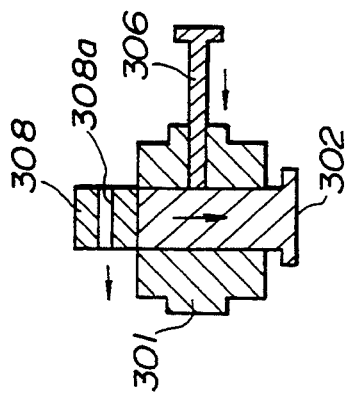

If the operation is such that extraction of the horizontal rod 306 is carried out in just a state that pressing operation is finished as shown in FIG. 10b, the horizontal drive apparatus 307 is enlarged or the life of a mold is decreased due to great extracting Force required. Referring to FIG. 10c, for avoiding this, the upper and lower punches 303, 302 are withdrawn by a small distance, for example, within 5% of a height of the compressed molding 8, respectively, which constitutes a pressure moderating process for decreasing force applied to the horizontal rod 306. Referring to FIG. 10d, after finishing this pressure moderating process, the horizontal drive apparatus 307 is actuated to extract the horizontal rod 306 from the side hole 308a of the compressed molding 308.

Figure 10E:
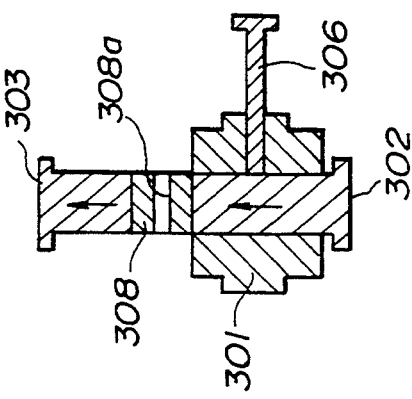

Next, referring to FIG. 10e, for preventing occurrence of a crack of the compressed molding 308, the compressed molding 308 is held by the upper and lower punches 308, 302, and moved upward simultaneously up to a position where the upper end face of the lower punch 302 corresponds to the upper side of the die 301. If the compressed molding 308 has a simple shape so that no possible occurrence of a crack exists, the lower punch 302 may be moved upward up to the above position after moving the upper punch 303 upward.

Figure 10F:
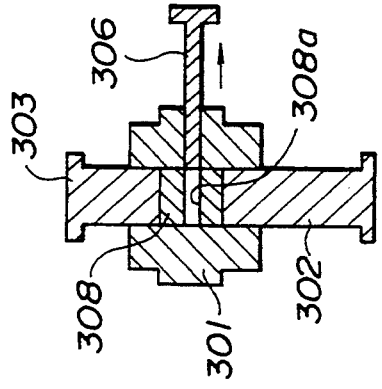

Referring to FIG. 10f, the compressed molding 308 is extracted from the mold space 305, and discharged from the mold by the feeder (not shown) when providing succedingly the powder 304, thus proceeding to a subsequent process. Additionally, after discharging the compressed molding 308, the lower punch 302 is moved downward so as to cooperate with the die 301 to define the mold space 305 to succedingly be filled with the powder 304 as shown in FIG. 10a, and the horizontal rod 306 is inserted into the mold space 305.

Referring to FIGS. 11a to 11f, there is shown a third preferred embodiment of the present invention. This embodiment is substantially similar to the second preferred embodiment except that a cylindrical powder molding has a top closed.

A press mold for use in this method comprises a cylindrical die 411 fixed to a die plate (not shown), a cylindrical lower punch 412 moved upward and downward by a pressure drive apparatus (not shown) such as a hydraulic cylinder and inserted into an axial hole of the die 411 from the lower direction, a core rod 419 moved upward and downward by another cylindrical pressure drive apparatus (not shown) such as a hydraulic cylinder which pierces through the axial hole of the lower punch 412 and inserted therein from the lower direction, and a cylindrical upper punch 413 moved upward and downward by the other pressure drive apparatus (not shown) such as a crank mechanism and inserted into the axial hole of the die 411 from the upper direction. The press mold has a mold space 415 to be filled with a powder 414 which is defined by the axial hole of the die 411, an upper end face of the lower punch 412, and an upper end of the core rod 419 which pierced through the lower punch 412.

A side hole forming apparatus comprises a pair of side hole shaping horizontal rods 416, 416 movably arranged in such a manner as to pierce through right and left portions of the die 411 and traverse horizontally in a vertically viewed center portion of the mold space 415, and a pair of horizontal drive apparatus 417, 417 for horizontally driving the horizontal rods 416, 416 such as a hydraulic or pneumatic cylinder. In this embodiment, each horizontal rod 416 is installed to have a pointed end contacting a side face of the core rod 419 on the upper end side thereof.

Manufacture of the powder molding having a side hole by such apparatus is carried out in accordance with processes as shown in FIGS. 11a to 11f.

Referring to FIG. 11a, the lower punch 412 is inserted into the axial hole of the die 411 at a predetermined position thereof, and the core rod 419 which pierced through the lower punch 412 is inserted into the axial hole of the die 411 at a more upper predetermined position, thus defining the mold space 415. The horizontal rods 416, 416 are protruded to the mold space 415 in such a manner as to pierce through the die 411 from the right and left directions and have pointed ends contacting the core rod 419, whereas the upper punch 413 is located in an upper position apart from the mold space 415. In thins state, a feeder (not shown) provides the powder 414 to the mold space 415.

Next, referring to FIG. 11b, the upper punch 413 is moved downward and inserted into the mold space 415, while the lower punch 412 and the core rod 419 are move upward and inserted deeper into the mold space 415. The powder 414 is pressed by the upper punch 413, lower punch 412, and core rod 419 from both upper and lower directions, and compressed to arrive at a predetermined density. In connection with compressed molding 418 obtained, one part of the powder 414 compressed at an outer periphery of the core rod 419 by the upper and lower punches 413, 412 serves to forme a cylindrical portion having a cavity corresponding to side holes 418a, 418a by the horizontal rods 416, 416, whereas the other part of the powder 414 compressed by the core rod 419 and the upper punch 413 serves to forme a cover portion for closing a top of the cylindrical portion.

In this embodiment also, for pressing the horizontal rods 416, 416 at an equal compression rate from both upper and lower directions so as to avoid the horizontal rods 416, 416 being deformed by unbalance load upon pressing operation, it is necessary to determine a rate of a speed of the upper punch 413 to that one of the lower punch 412 to be proportional to a rate of a travel distance of the upper punch 413 to that one of the lower punch 412.

Next, referring to FIG. 11c, the upper and lower punches 413, 412 are withdrawn by a small distance, respectively, which constitutes a pressure moderating process for decreasing force applied to the horizontal rods 416, 416. Then, referring to FIG. 11d, the horizontal drive apparatus 417, 417 are actuated extract the horizontal rods 416, 416 from the side hole 418a, 418a of the compressed molding 418.

Next, referring to FIG. 11e, the compressed molding 418 is held by the upper and lower punches 413, 412 and the core rod 419, and moved upward simultaneously up to a position where the upper end faces of the lower punch 412 and the core rod 419 correspond to the upper side of the die 411. respectively, thus extracting the compressed molding 418 from the mold space 415 as shown in FIG. 11f.

Figure 12A:
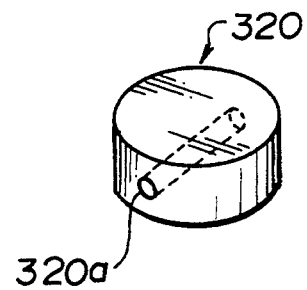
FIGS. 12a to 12d are schematic views showing examples of the powder molding having a side hole.
Figure 12B:
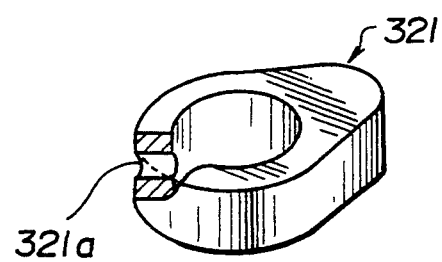
Figure 12C:
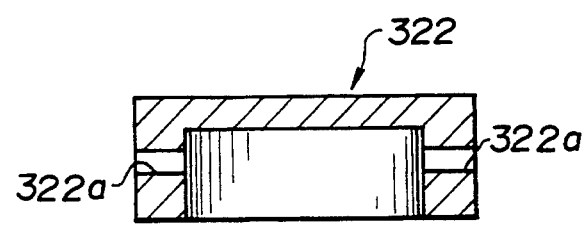
Figure 12D:
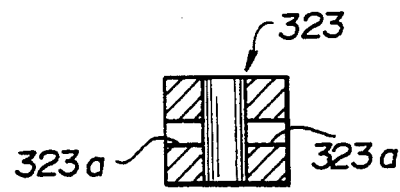

The methods as described in connection with the second and third preferred embodiments enable easy manufacture of various powder moldings having a side hole as shown, for example, in FIGS. 12a to 12d. Among them, referring to FIG. 12a, the cylindrical powder molding 320 having a side hole 320a which allows diametrical communication thereof can be produced by a simple application of the second preferred embodiment, whereas referring to FIG. 12c, the top closed cylindrical powder molding 322 having side holes 322a, 322a which allow diametrical communication of a cylindrical portion thereof can be produced by a simple application of the third preferred embodiment. Additionally, the powder molding 321 as shown in FIG. 12b can be formed with a side hole 321a by disposing only one of the horizontal rods 416, 416 in the third preferred embodiment, whereas the powder molding 323 as shown in FIG. 12d can be formed with side holes 323a, 323a by carrying out molding in a state that the upper end of the core rod 416 corresponds to that one of the lower punch 412 in the third preferred embodiment.

The apparatus which carries out the above methods are provided with a monitor protector means for preventing occurrence of the following anomalies:

If a difference is found between applied forces from the upper and lower directions upon pressing operation due to error of adjustment method, etc., exact shaping of the a side hole may be impossible, and the horizontal rod 308, 416 may be deformed to produce scuffing upon extraction thereof which results in shortened life of the mold, or impossible extraction thereof which results in breakage of the mold.

Figure 13:
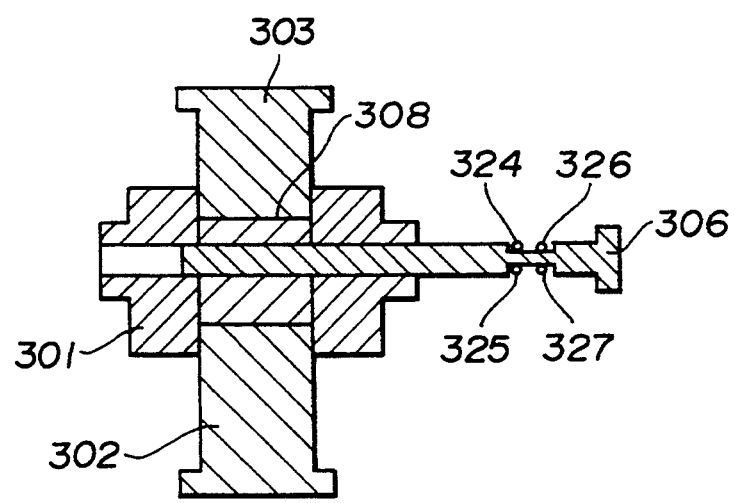
FIG. 13 is a view similar to FIGS. 11a to 11f, showing a molding apparatus provided with a monitor protector means.

Therefore, referring to FIG. 13, in the second preferred embodiment, the horizontal rod 306 is constructed to have, for example, a double-chamfered portion to which strain sensors 324, 325 are mounted, respectively, for sensing a bending stress of the horizontal rod 806 when undergoing unequal forces from the upper and lower directions. Detected signals of the sensors 324, 325 are fetched as an output difference by a well-known bridge circuit (not shown) and amplified appropriately. As soon as the detected signals are found not to be within allowable ranges when compared with preset values, pressing operation of the punches is stopped, or withdrawal of the punches is carried out after stoppage so as to clear up immediately the causes of the anomaly.

Moreover, if scuffing is produced due to the horizontal rod 306 deformed as describe above, or stuffing with the powder 304 occurs, extraction of the horizontal rod 806 needs gradually increased force, resulting in impossible extraction thereof due to seizure or possible breakage of the mold.

Therefore, for monitoring this extracting force of the horizontal rod 306, strain sensors 326, 327 are arranged as shown in FIG. 13 for sensing axial. stresses in the extracting direction of the horizontal rod 306 and in the compressing direction thereof. Detected signals of the sensors 326, 327 undergo the same processing as described above to estimate the extracting force of the horizontal rod 306 upon extraction. If this extracting force if found not be within an allowable range for a preset value, a stoppage or cancellation of pressing operation is carried out.

Figure 14:
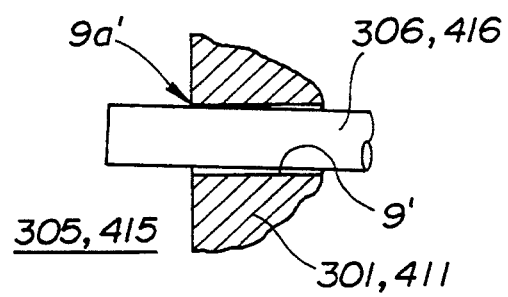
FIG. 14 is a fragmentary section showing a horizontal rod as bent.

With the above side hole forming method, the above different means are provided for preventing inequality of applied forces of the upper and lower punches and harmful effects thereof, which cannot perfectly dissolve inequality of applied forces, however. Thus, referring to FIG. 14, if the horizontal rod 306, 416 as shown in FIGS. 10a and 11a has a slight bend (exaggerated in FIG. 14), the horizontal rod 306, 416 comes in contact with an opening edge 9a' of a guide hole 9' formed in one of the dies 301, 411 upon extraction of the horizontal rod 306, 416 from the mold space 305, 415, resulting in possible occurrence of a scuffing phenomenon or impossible extraction.

Figure 15:
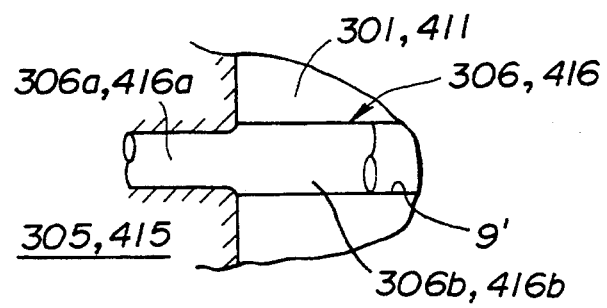
FIG. 15 is a view similar to FIG. 14, showing a first example of a means for minimizing a bend of the horizontal rod.

Therefore, the molding apparatus has the following preventing means so as to decrease the bend of the horizontal rod 306, 416 and enlarge an allowance of the bend:

Referring to FIG. 15, in a first example, the horizontal rod 306, 416 has on the pointed end side thereof a cylindrical shaping portion 306a, 416a inserted into the mold space 305, 415 and having an outer diameter equal to an inner diameter of the side hole to be shaped in The powder moldings, whereas has on the base side thereof a cylindrical guide portion 306b, 416b having a larger diameter than the shaping portion 406a, 416a.

Moreover, the die 301, 411 for receiving the horizontal rod 306, 416 has on the access side thereof a circular guide hole 9' having a slightly larger diameter than the guide portion 306b, 416b so that the guide portion 306b, 416b are slidable in a closely engaged state.

Figure 16A:
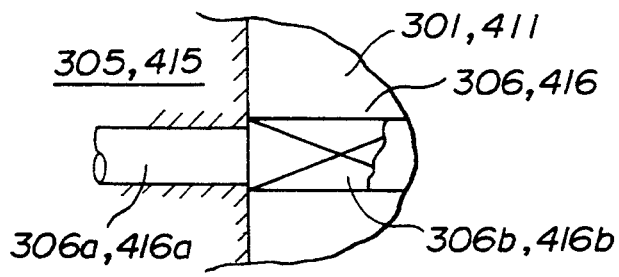
FIGS. 16a and 16b are views similar to FIG. 15, showing a second example of a means for minimizing a bend of the horizontal rod.
Figure 16B:
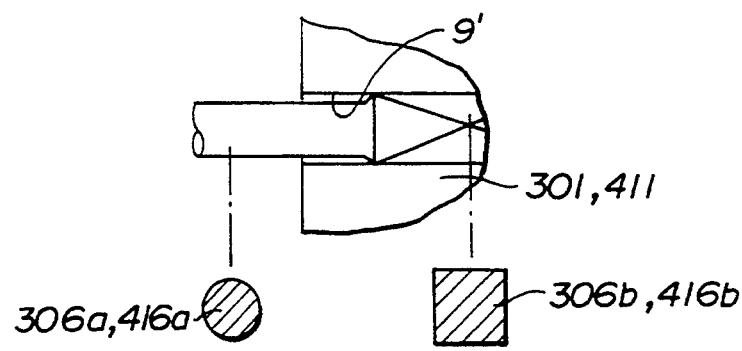

Referring to FIGS. 16a and 16b, in a second example, the horizontal rod 306, 416 has a small diameter shaping portion 306a, 416a having a circular section, and a large diameter guide portion 806b, 416b having a square section. One of the dies 301, 411 is formed with a square guide hole 9' for slidably receiving the guide portion 306b. 416b in a close engaged state. It is to be noted that FIG. 16a shows a molding state with the shaping portion 306a, 416a inserted into the mold space 305, 415, whereas FIG. 16b shows an extracting state with the shaping portion 306a, 416a extracted from the mold space 305, 415 after completion of molding.

Figure 17A:
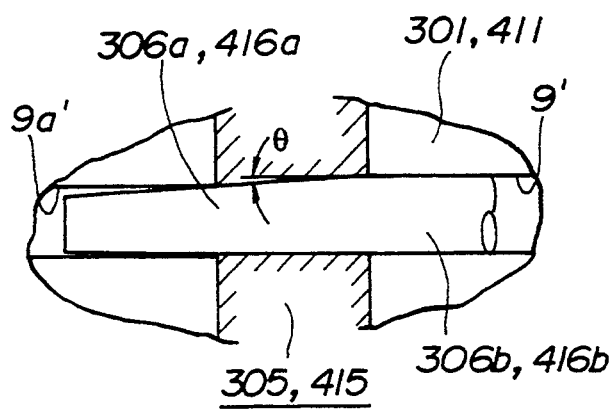
FIGS. 17a and 17b are views similar to FIGS. 116a and 16b, showing a third example of a means for minimizing a bend of the horizontal rod.
Figure 17B:
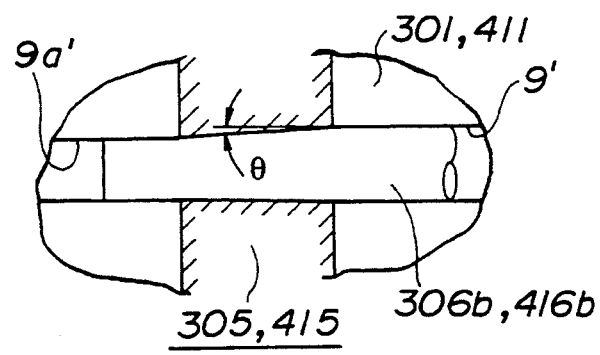

Referring to FIGS. 17a and 17b, in a third example, the horizontal rod 306, 416 has a small diameter shaping portion 306a, 416a having a draft of $\theta$ or a gradual taper from circular large diameter guide portion 306b, 416b. Referring to FIG. 17a, another of the dies 301, 411 is formed with a guide hole 9a' for receiving a pointed end of the shaping portion 306a, 416a after piercing through the mold space 305, 415, which has the same diameter as the guide hole 9' and is engaged with a pointed end of the shaping portion 306a, 416a with a play. Referring to FIG. 17b, another of the dies 301, 411 is formed with a tapered guide hole 9a' having a slightly larger diameter than the pointed end of the shaping portion 306a, 316a so as to obtain a closely engaged state.

Figure 18:
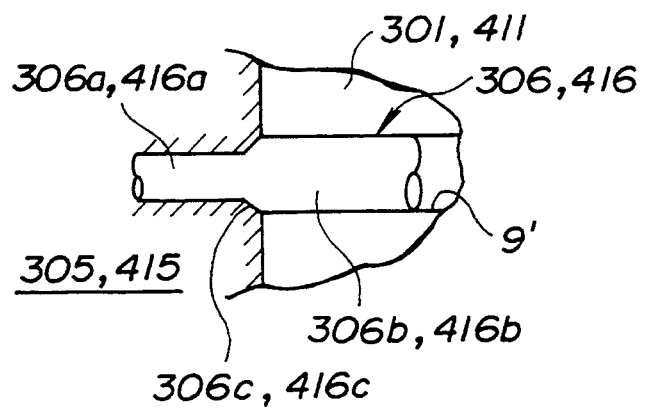
FIG. 18 is a view similar to FIGS. 17a and 17b, showing a fourth example of a means for minimizing a bend of the horizontal rod.

Referring to FIG. 18, in a fourth example, chamfering of an opening edge of the side hole is carried out, for example, in the first example. The horizontal rod 306, 416 has on the pointed end side thereof a cylindrical shaping portion 306a, 416a inserted into the mold space 305, 415 and having an outer diameter equal to an inner diameter of the side hole to be shaped in the powder molding, whereas it has on the base side thereof a cylindrical guide portion 306b, 416b having a larger diameter and slidably inserted into a guide hole 9'. The guide portion 306b, 416b has a pointed end connected to the shaping portion 306a, 416a through a chamfering tapered portion 306c, 416c having a truncated cone shape and a gradually decreased diameter.

With the above molding apparatus, the guide portion 306b, 416b formed on the base side of the horizontal rod 306, 416 has a larger diameter than the shaping portion 306a, 416a formed on the pointed end side thereof for purposes of reinforcement, and is slidably inserted into the guide hole 9' in a closely engaged state so as to eliminate a play, thus minimizing a bend of the horizontal rod 306, 416 due to inequality of applied forces of the upper and lower punches.

Further, the shaping portion 306a, 416a has a smaller diameter than the guide hole 9', so that even with occurrence of a slight bend of the shaping portion 306a, 416a, easy passage of the horizontal rod 306, 416 is obtained without scuffing between the shaping portion 306a, 416a and the opening edge of the guide hole 9' of the die 301, 411.

Furthermore, the chamfering tapered portion 306c, 416c formed adjacent to the pointed end of the guide portion 306b, 416b cooperates with the guide portion 306b, 416b to minimize a bend of the shaping portion 306a, 416a, and serves to chamfer the opening edge of the side hole of the powder molding in entering the mold space 305, 415.

What is claimed is:

1. A method of manufacturing a powder molding having a predetermined portion, the method relying upon at least one die formed with a space having an opening on both ends thereof, first and second punches and a means for shaping the predetermined portion of the powder molding, the method comprising the steps of:
   filling the space of the at least one die with a powder;
   pressing said powder in the space of the at least one die by the first and second punches inserted therein through the opening of the at least one die; and
   withdrawing the shaping means from the space of at least one die for extracting the powder molding.

2. A method as claimed in claim 1, wherein said filling step is carried out with a filling amount of said powder being increased.

3. A method as claimed in claim 1, wherein said pressing step is carried out with a relative movement speed of the at least one die and the first and second punches being controlled so that a rate of pressing speeds thereof for different portions of the powder molding is substantially the same as that one of the dimensions of corresponding portions of a finished powder molding throughout all pressing process.

4. A method as claimed in claim 1, wherein said withdrawing step is carried out with the at least one die and the first and second punches being relatively moved in the opposite direction to decrease a force applied thereto.

5. A method as claimed in claim 3, wherein said pressing step is carried out with a sensor as mounted to the at least one die generating an error signal when a difference is produced between applied forces of the first and second punches.

6. A method as claimed in claim 4, wherein said withdrawing step is carried out with a product ejector bar jetting an air to blow away said powder placed on the at least one die and the first and second punches.

7. A method as claimed in claim 6, wherein said withdrawing step is carried out with said product ejector bar vacuuming said powder placed on the at least one die and the first and second punches.

8. An apparatus for manufacturing a powder molding having a predetermined portion, comprising:
   at least one die formed with a space to be filled with a powder, said space having an opening on both ends thereof:
   first and second punches arranged to be inserted into said space of said at least one die through said opening, said first and second punches pressing said powder in said space of said at least one die; and
   a means, movably arranged relative to said space of said at least one die, for shaping the predetermined portion of the powder molding, said shaping means having a shape corresponding to a shape of the predetermined portion of the powder molding.

9. An apparatus as claimed in claim 8, wherein said shaping means is in the form of a cam die having two divided portions.

10. An apparatus as claimed in claim 8, wherein said at least one die is formed with a guide hole.

11. An apparatus as claimed in claim 9, wherein said shaping means is in the form of a rod having a first portion located on the base side thereof and a second portion located on the pointed end side thereof to be inserted into said space of said at least one die, said first portion having a larger diameter than said second portion, said second portion being slidably fitted into said guide hole of said at least one die.

12. An apparatus as claimed in claim 11, wherein said first portion of said rod has a square section, and said second portion of said rod has a circular section.

13. An apparatus as claimed in claim 12, wherein said second portion of said rod has a draft or a gradual taper from said first portion.

14. An apparatus as claimed in claim 13, wherein said second portion of said rod has a tapered portion for chamfering an opening edge of the predetermined portion of the powder molding.

* * * * *